Oct. 28, 1924.
T. R. MILLER
1,513,668
WATER FILTER
Filed Nov. 11, 1922    2 Sheets-Sheet 1
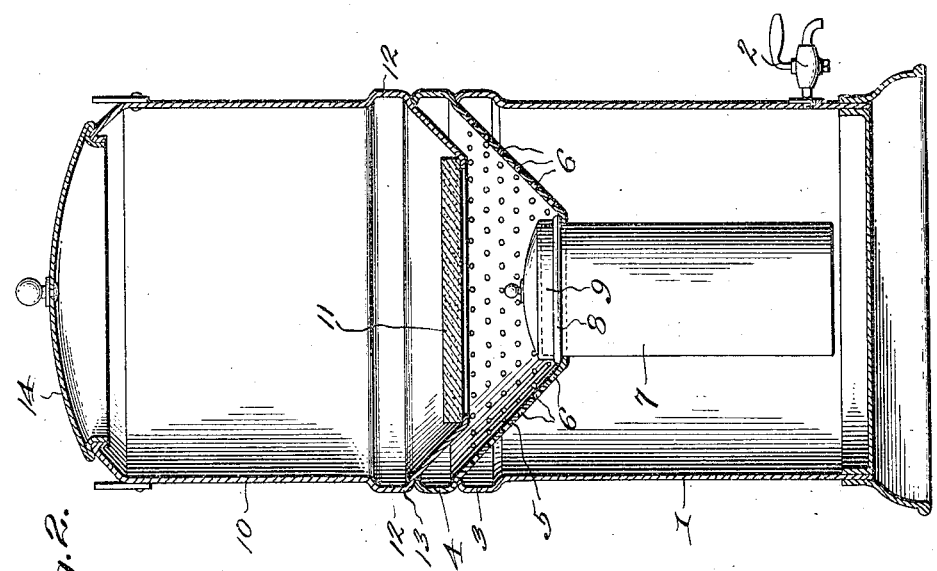
T. R. Miller,
INVENTOR

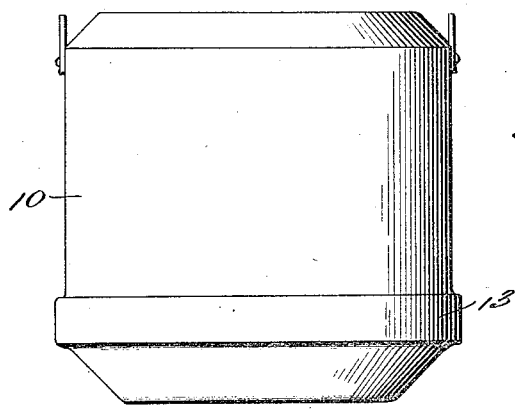
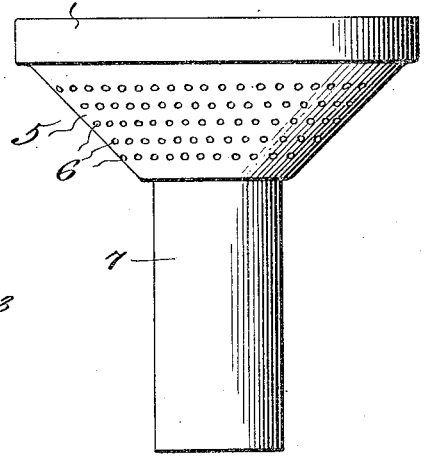
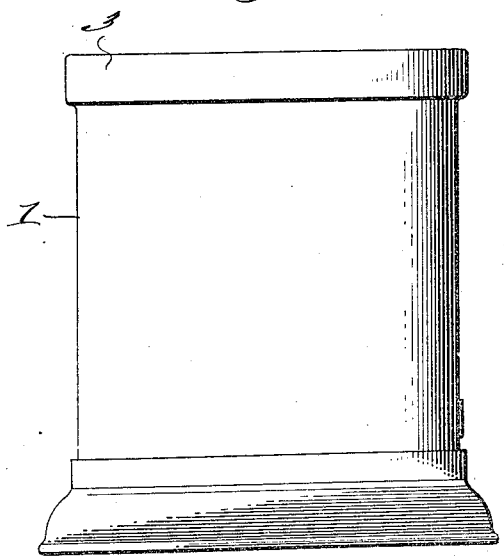

Patented Oct. 28, 1924.

1,513,668

UNITED STATES PATENT OFFICE.

THOMAS R. MILLER, OF JACKSONVILLE, FLORIDA.

WATER FILTER.

Application filed November 11, 1922. Serial No. 600,319.

*To all whom it may concern:*

Be it known that I, THOMAS R. MILLER, a citizen of the United States, residing at Jacksonville, in the county of Duval and State of Florida, have invented new and useful Improvements in Water Filters, of which the following is a specification.

This invention relates to a water filter and cooler combined, the general object of the invention being to provide a device having an upper compartment into which the unfiltered water is placed and having a filtering medium in its bottom and a second compartment for receiving the water passing through the filtering medium and having cooling means therein.

Another object of the invention is to provide means whereby the parts can be easily separated to clean the same and for renewing the ice and water supply.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is an elevation of the invention.

Figure 2 is a longitudinal sectional view.

Figure 3 is a view of the filtering bucket.

Figure 4 is a view of the ice tank and drain pan.

Figure 5 is a view of the lower compartment.

In these views 1 indicates the lower compartment which is made of any desired shape and of any desired size. It may be provided with a faucet 2 so that the contents may be easily drawn therefrom. The top of the member 1 is provided with a rounded ledge 3 which is engaged by the ledge 4 on the drain pan 5. This ledge 4 is placed at the top of the drain pan so that when the two ledges are in engagement the drain pan will fit within the member 1. The lower part of the pan is provided with sloping walls which are perforated, as shown at 6, and the lower end of the pan is made to receive the upper end of an ice tank 7 which is provided with a bead 8 for engaging the lower edge of the pan. Thus the ice tank is suspended in the member 1. The top of the tank is closed by a cover 9 which is located within the drain pan and can be readily removed from the upper end of the pan so that ice can be placed in the tank. The filter receptacle is shown at 10, the bottom of this receptacle being formed of a filtering medium 11 which is supported by the inclined lower walls 12 of the receptacle. A ledge 13 is formed on the receptacle above the inclined walls 12 thereof to engage the ledge 4 of the drain pan so that the water passing through the filtering medium will pass into the drain pan. The open upper end of the receptacle is closed by the cover 14 and a bail 15 is also connected with said receptacle.

It will thus be seen that when the parts are placed together and the tank 7 filled with ice and the receptacle 10 with water, this water will pass through the filter medium 11 so that impurities will be taken therefrom and the filtered water will pass into the pan 5 and through the perforations 6 into the member 1. This water will surround the ice tank and will thus be chilled.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a receptacle, a pan of tapered shape having a rim at its upper enlarged end for engaging the rim of the receptacle with its tapered part depending into the receptacle, said pan having a central opening therein, an ice tank having a bead at its upper end for supporting the tank in the said opening in the pan, a cover for said tank, a filter bucket having a rim adjacent its end for resting upon the rim of the pan, said bucket having an inwardly sloping bottom part extending into the pan, filtering material forming a portion of the bottom of the bucket and a cover for said bucket.

In testimony whereof I affix my signature.

THOMAS R. MILLER.